United States Patent [19]
Shinohara

[11] Patent Number: 6,122,251
[45] Date of Patent: Sep. 19, 2000

[54] SWITCH CONTROL CIRCUIT AND CONTROL METHOD OF ATM SWITCHBOARD

[75] Inventor: Masayuki Shinohara, Tokyo, Japan

[73] Assignee: NEC Corporation, Tokyo, Japan

[21] Appl. No.: 08/968,568

[22] Filed: Nov. 12, 1997

[30] Foreign Application Priority Data

Nov. 13, 1996 [JP] Japan ................................ 8-300744

[51] Int. Cl.[7] .......................... G01R 31/08; H04L 12/28
[52] U.S. Cl. ...................... 370/231; 370/395; 370/236; 370/413
[58] Field of Search .................... 370/230, 231, 370/232, 235, 237, 395, 398, 412, 414, 413; 709/232, 235

[56] References Cited

U.S. PATENT DOCUMENTS

| | | | |
|---|---|---|---|
| 5,392,280 | 2/1995 | Zheng | 370/60 |
| 5,629,928 | 5/1997 | Calvignac et al. | 370/237 |
| 5,677,906 | 10/1997 | Hayter et al. | 370/235 |
| 5,699,519 | 12/1997 | Shiobara | 370/230 |
| 5,704,047 | 12/1997 | Schneeberger | 370/229 |
| 5,901,140 | 5/1999 | Van As et al. | 370/236 |
| 5,914,936 | 6/1999 | Hatono et al. | 370/230 |

FOREIGN PATENT DOCUMENTS

| | | |
|---|---|---|
| 0 603 916 | 6/1994 | European Pat. Off. . |
| 0 661 851 | 7/1995 | European Pat. Off. . |
| 0 706 297 | 4/1996 | European Pat. Off. . |

OTHER PUBLICATIONS

B. Mark et al., "Large Capacity Multiclass ATM Core Switch Architecture", ISS '97, XVI World Telecom Congress Proceedings, Sep. 21, 1997, pp. 417–423.

Ruixue Fan et al., "Expandable ATOM Switch Architecture (XATOM) for ATM LANs", *1994 IEEE*, 1994, pp. 402–409.

*Primary Examiner*—Hassan Kizou
*Assistant Examiner*—Hanh Nguyen
*Attorney, Agent, or Firm*—Sughrue, Mion, Zinn, Macpeak & Seas, PLLC

[57] ABSTRACT

To realize the traffic control for controlling congestion in an ATM switchboard and assuring the throughput of VCs using the same output port.

A buffer occupancy value measuring section measures the queue length of each of the output port buffers and stores the data in a buffer occupancy value table. A back-pressure outputting section outputs a transmission restart signal when a queue length in the buffer occupancy table is equal to or less than a fist threshold, a transmission control signal when the queue length is between the first threshold and a second threshold, and a transmission stop signal when the queue length is equal to or more than the second threshold as back pressure signal respectively. A cell transmission control section transmits an ATM cell without comparing a transmission time with the present time when the instruction of a back pressure signal corresponding to a destination port indicates "restart" and transmits an ATM cell only when the transmission time is earlier than the present time if the instruction indicates "control".

24 Claims, 18 Drawing Sheets

FIG. 3
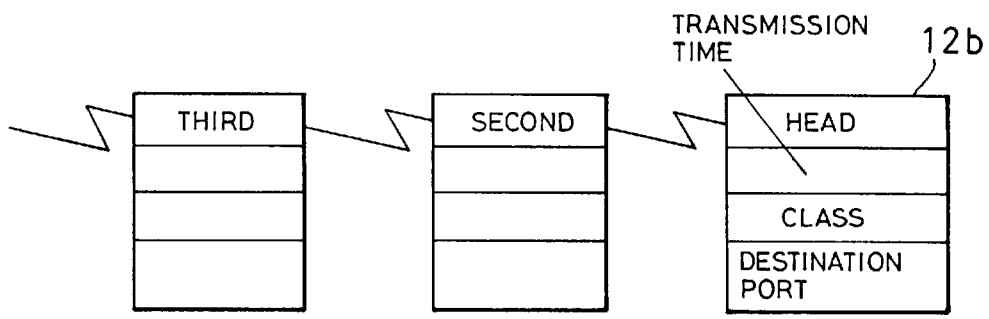
FIG. 4
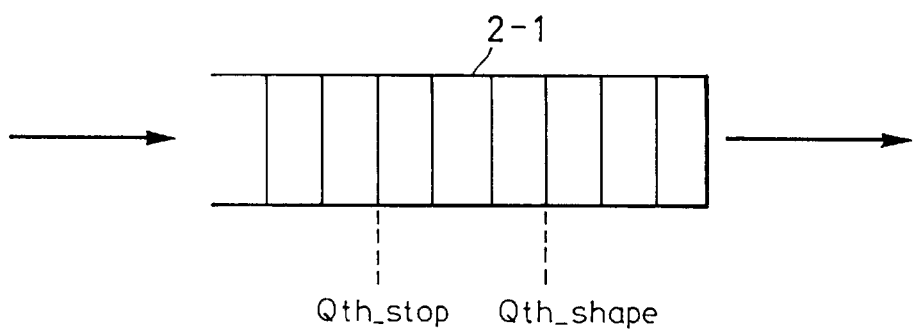
FIG. 5

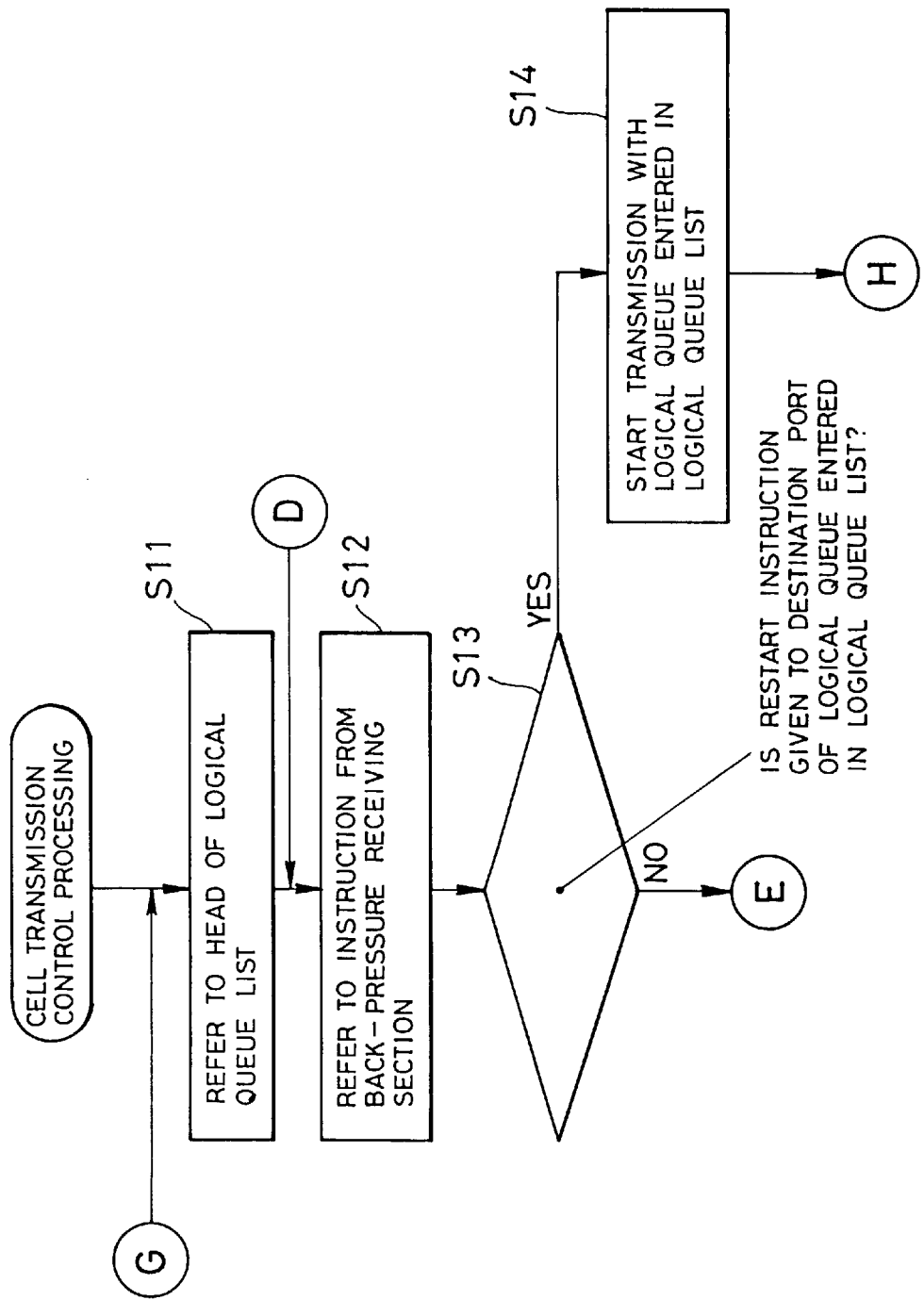

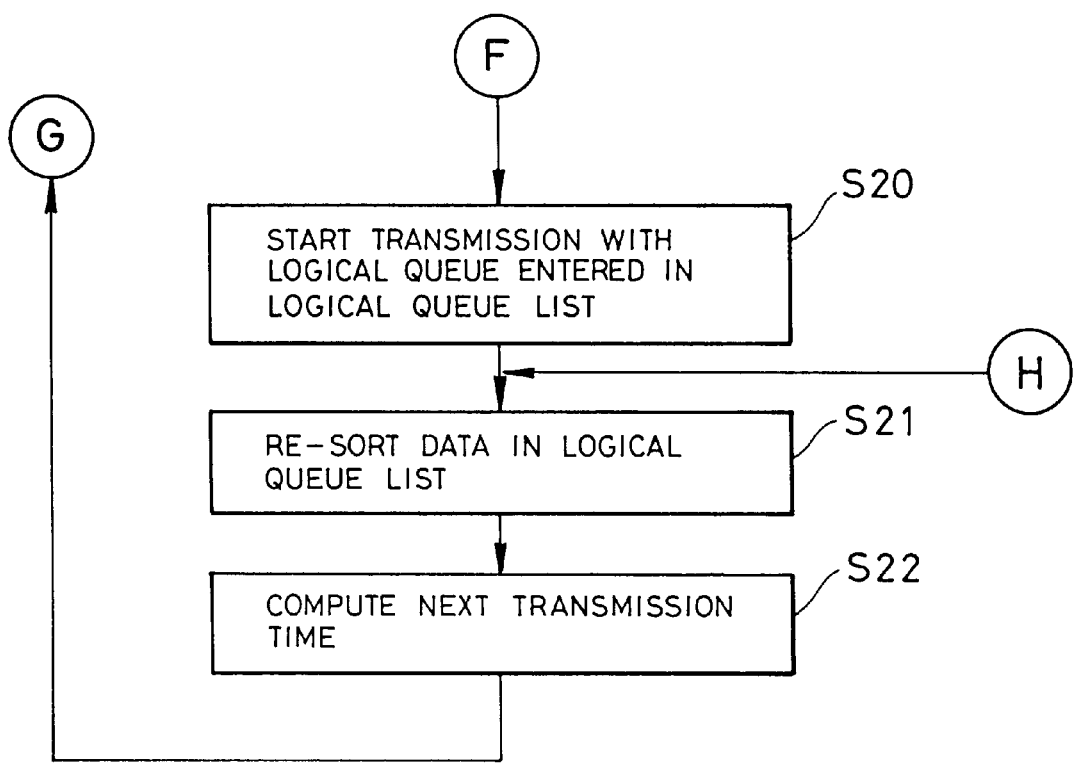

SWITCH CONTROL CIRCUIT AND CONTROL METHOD OF ATM SWITCHBOARD

BACKGROUND OF THE INVENTION

1. Field of the Invention

The present invention relates to a switch control circuit and a switch control method of an ATM switchboard, particularly to a switch control circuit and a switch control method of an ATM switchboard for switching an ATM (Asynchronous Transfer Mode) cell between input and output ports.

2. Description of the Related Art

Conventionally, the above type of ATM switchboard, as shown in FIG. 16, comprises an input port buffer 5, output port buffers 2-1 to 2-n (output port buffers 2-4 to 2-n are not illustrated), a buffer occupancy value measuring section 3, and a back-pressure outputting section 6. Moreover, the input port buffer 5 comprises a separator 50 for each port, output port corresponding logical queues 51-1 to 51-n, a cell transmission control section 52, and a back-pressure receiving section 53. For the above ATM switchboard, a case is assumed in which one traffic class is used in order to simplify the description.

FIG. 17 is a flow chart showing the back-pressure control by the back-pressure outputting section 6 in FIG. 16. The cell switching operation of a conventional ATM switch board is described below by referring to FIGS. 16 and 17.

The destination output port of an ATM cell incoming from an input port 100 is identified by the separator 50 for each port in the input port buffer 5 and then stored in proper output port corresponding logical queues 51-1 to 51-n in accordance with the identified result. The cell transmission control section 52 controls transmission of the ATM cell in accordance with the rotation preferential control of cyclically carrying about a cell transmission right between the output port corresponding logical queues 51-1 and 51-n.

ATM cells fetched from the output port corresponding logical queues 51-1 to 51-n selected in accordance with the processing by the cell transmission control section 52 are stored in the output port buffers 2-1 to 2-n corresponding to the destination output ports via an input port signal line 101 and a time-division multiplexing bus 102.

In the output port buffers 2-1 to 2-n, cells are successively transmitted to output ports 103-1 to 103-n output ports 103-4 to 103-n are not illustrated) starting with the first cell. The buffer occupancy value measuring section 3 observes the queue length of each of the output port buffers 2-1 to 2-n.

When the back-pressure outputting section 6 refers to the queue length information of each of the output port buffers 2-1 to 2-n of the buffer occupancy value measuring section 3 (step S31 in FIG. 17) and detects that the output port buffers 2-1 to 2-n brought under a congested state because queue lengths exceeding a preset threshold are present (step S32 in FIG. 17), it transmits a transmission stop (STOP) signal 113 specifying a congested output port and a transmission restart (GO) signal 111 specifying output ports other than the congested output port to all input port buffers 5 (steps S33 and S35 in FIG. 17).

Moreover, unless the back-pressure outputting section 6 detects the output port buffers 2-1 to 2-n brought under a congested state because queue lengths exceed a threshold are present (step S32 in FIG. 17), it transmits the transmission restart (GO) signal 111 specifying all output ports to all input port buffers 5 (steps S34 and S35 in FIG. 17).

The back-pressure receiving section 53 receiving the transmission stop (STOP) signal 113 specifies an output port transmitting a back-pressure signal out of received back-pressure signal information and notifies the cell transmission control section 52 so as to inhibit transmission of cells from the output port corresponding logical queues 51-1 to 51-n corresponding to the output port.

When the congestion of the output port buffers 2-1 to 2-n is cancelled, the back-pressure receiving section 53 transmits the transmission restart (GO) signal 111 specifying the output port and restarts the transfer of cells to output ports in which transmission has been stopped.

As described above, to control the traffic between an input port and an output port of a conventional ATM switchboard, only the simple back-pressure control is present in which a back-pressure signal for commanding stop/restart of the output of a cell to a specified output port is issued to all input port buffers 5 in order to prevent a cell loss in the output port buffer of the output port when the specific output port is congested.

Moreover, for the input port buffer 5, a technique of strictly controlling transmission of cells by transmitting a cell from each logical queue and then computing the next cell transmission time is considered instead of the rotation preferential control. However, either of the following two cases are conventionally used: a case of comparing the above transmission time with the present time and transmitting cells when the transmission time is earlier than the present time and a case of transmitting cells at random in accordance with a transmission time sequence without comparing the transmission time with the present time.

Problems to be Solved by the Invention

In the case of the conventional back-pressure control described above, if the congestion due to simultaneous arrival of ATM cells at the same output port from a plurality of input ports occurs, a transmission stop signal for preventing a cell loss in an output port buffer is output. Then, when the congestion is released and a transmission restart signal is output, the transmission stop signal is output again because the congestion due to the simultaneous arrival recurs though input port buffers simultaneously restart cell transmission.

As described above, in the case of the conventional back-pressure control, each input port buffer synchronously repeats transmission restart and transmission stop and therefore, the throughput from each input port to the same output port is uniform. Particularly, when the original traffic value bound for the same output port fluctuates between input ports, VCs (Virtual Channels) using the same output port may not be able to compensate the throughput at all though they reserve bands.

In the case of the cell transmission control performed by an input port buffer, the next transmission time is computed whenever transmitting a cell. However, when performing the control of continuously comparing a transmission time with the present time and transmitting a cell when the transmission time is earlier than the present time, a state in which no cell can be transmitted from an input port buffer occurs though no output port buffer is congested. Therefore, a problem of inefficient use of an output port buffer occurs.

Moreover, when performing the control of not continuously comparing a transmission time with the present time, the problem of inefficient use of an output port buffer is solved. However, congestion frequently occurs because cells are sent from an input port buffer at random and the problem due to the conventional back-pressure control starts having an influence.

SUMMARY OF THE INVENTION

Therefore, it is an object of the present invention to solve the above problems and provide a switch control circuit of an ATM switchboard capable of controlling congestion in the ATM switchboard and performing the traffic control assuring the throughput of VCs using the same output port.

A switch control circuit in accordance with an embodiment of the present invention is a switch control circuit of an ATM switchboard for switching an ATM cell transferred in an asynchronous mode between an input port and an output port, which comprises an input port buffer and an output port buffer provided correspondingly to the input port and the output port respectively to perform ATM cell exchange between the input port and the output port; a back-pressure function for outputting any one of a transmission restart signal, transmission stop signal, and transmission control signal in accordance with the occupancy value of the output port buffer in order to prevent cells from being inefficiently used by the output port buffer; and cell transmission control means for performing control so as to transmit the ATM cell at a preset first rate to an output port for transmitting the ATM cell when the transmission restart signal is input from the back-pressure function correspondingly to the output port and transmit the ATM cell at a preset second rate to an output port for transmitting the ATM cell when the transmission control signal is input from the back pressure function correspondingly to the output port.

Moreover, a switch control method of an ATM switchboard according to the present invention for switching an ATM cell transferred in an asynchronous mode between an input port and an output port, which comprises the first step of outputting any one of a transmission restart signal, transmission stop signal, and transmission control signal in accordance with the occupancy value of the output port buffer in order to prevent cells in an output port buffer provided correspondingly to the output port from being inefficiently used and the second step of performing control so as to transmit the ATM cell at a preset first rate to an output port for transmitting the ATM cell when the transmission restart signal is input in the first step correspondingly to the output port and transmitting the ATM cell to an output port for transmitting the ATM cell at a preset second rate, when the transmission control signal is input in the first step correspondingly to the output port.

That is, to solve the above problems, the present invention is constituted so that a back pressure signal to be transferred between an input port buffer and an output port buffer uses such three types of signals as a transmission restart (GO) signal, transmission stop (STOP) signal, and transmission control (SHAPE) signal.

In the case of an input/output-buffer-type ATM switchboard provided with the back pressure control having the above structure, an input port buffer transmits a cell to an output port currently outputting a transmission restart signal at a first rate (R1) and transmits a cell to an output port currently outputting a transmission control signal at a second rate (R2).

When selecting the port maximum rate as the first rate (R1), the next cell transmission time is computed in accordance with the second rate (R2) whenever transmitting a cell from each logical queue by an input port buffer, a cell is only transmitted simply in accordance with a transmission time sequence while receiving a transmission restart signal, and a cell is transmitted in accordance with a transmission time sequence similarly to the above while receiving a transmission control signal. However, a transmission time is always compared with the present time so as to transmit a cell only when the transmission time is earlier than the present time.

Thereby, the traffic control is realized which controls the occurrence of congestion in an ATM switchboard and assures the throughput of VCs using the same output port.

BRIEF DESCRIPTION OF THE DRAWINGS

FIG. 3 is an illustration showing an example of the logical queue list of the cell transmission control section in FIG. 1;

FIG. 4 is an illustration showing an example of the information contents of the buffer occupancy value measuring section in FIG. 1;

FIG. 5 is an illustration showing an example of threshold setting in the output port buffer in FIG. 1;

FIGS. 7A, 7B and 7C are flow charts showing the cell transmission control by the cell transmission control section in FIG. 1;

DESCRIPTION OF THE PREFERRED EMBODIMENT

Figure 1:
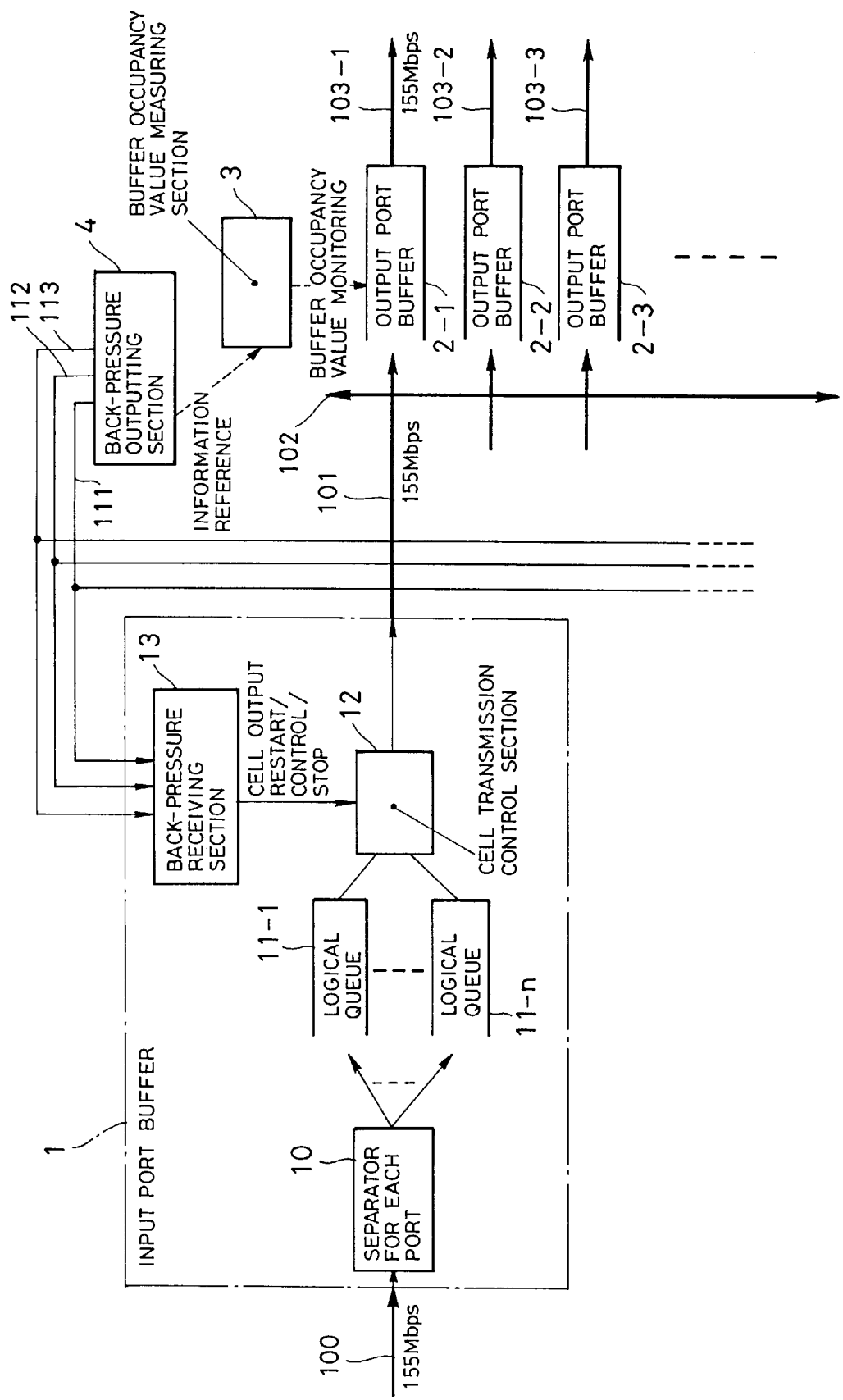
FIG. 1 is a block diagram showing the structure of an embodiment of the present invention.

Then, an embodiment of the present invention is described below by referring to the accompanying drawings. FIG. 1 is a block diagram showing the structure of the embodiment of the present invention. In FIG. 1, the ATM switchboard of the embodiment of the present invention comprises an input port buffer 1, output port buffers 2-1 to 2-n (output port buffers 2-4 to 2-n are not illustrated), a buffer occupancy value measuring section 3, and a back-pressure outputting section 4. Moreover, the input port buffer 1 comprises a separator 10 for each port, an output port corresponding logical queues 11-1 to 11-n, a cell transmission control section 12, and a back-pressure receiving section 13.

The input port buffer 1 includes output port corresponding logical queues 11-1 to 11-n corresponding to output ports 103-1 to 103-n (output ports 103-4 to 103-n are not illustrated) respectively to make queuing possible for each of the output ports 103-1 to 103-n.

By preparing the output port corresponding logical queues 11-1 to 11-n for each traffic class, it is possible to easily provide a multitraffic class environment. In the case of an embodiment of the present invention, it is assumed that one traffic class is used in order to simplify the description. However, it is possible to prepare traffic classes corresponding to a desired number of service classes.

Figure 2:
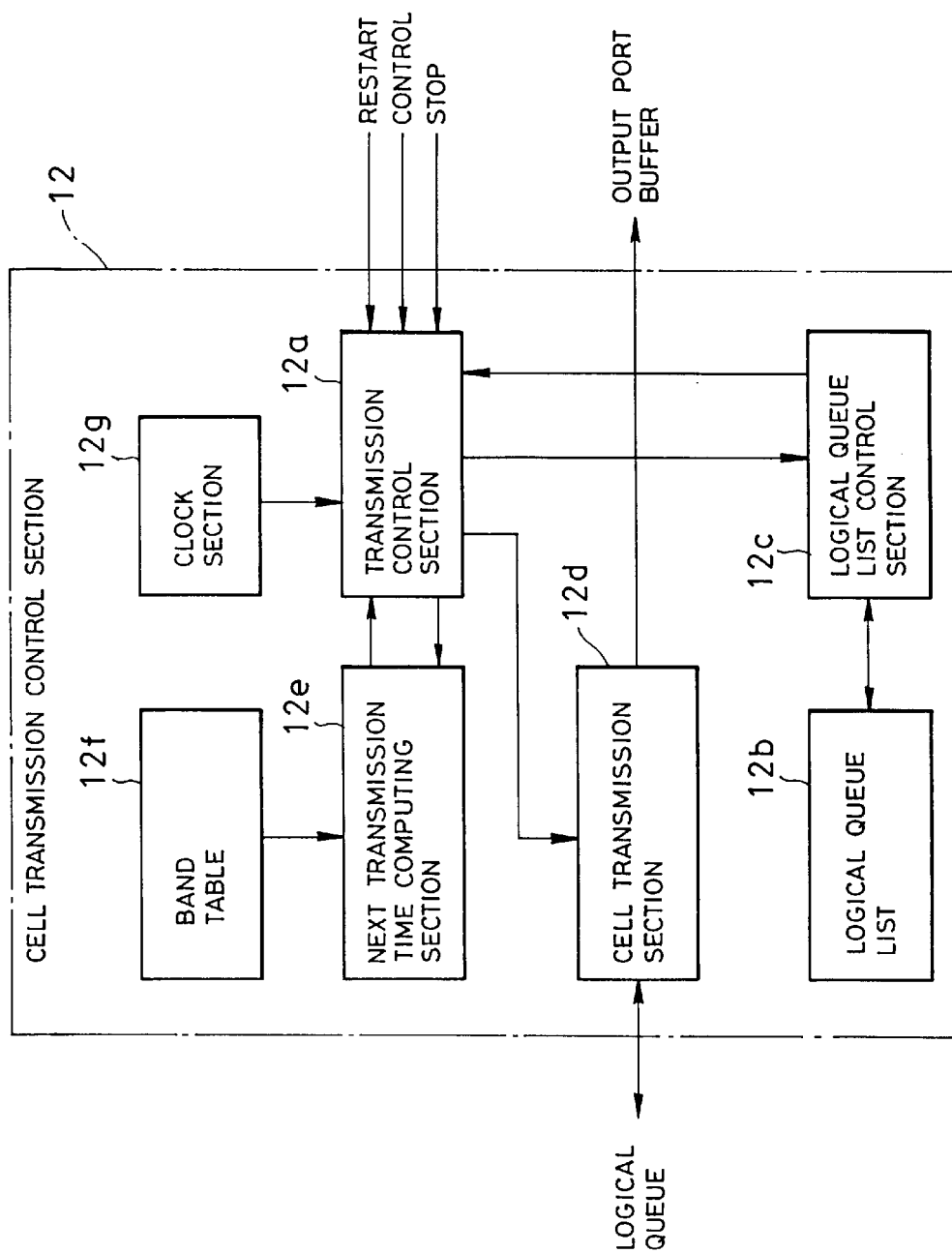
FIG. 2 is a block diagram showing the structure of the cell transmission control section 12 in FIG. 1.

FIG. 2 is a block diagram showing the structure of the cell transmission control section 12 in FIG. 1. In FIG. 2, the cell transmission control section 12 comprises a transmission control section 12a, a logical queue list 12b, a logical queue list control section 12c, a cell transmitting section 12d, a next transmission time computing section 12e, a band table 12f, and a clock section 12g.

While referring to FIGS. 1 and 2, the cell switching operation of the ATM switchboard of an embodiment of the present invention is described below. The input port buffer 1 identifies the destination output port of an ATM cell incoming from the input port 100 by the separator 10 for each port and stores the destination output port of the ATM cell in proper output port corresponding logical queues 11-1 to 11-n in accordance with the identified result.

The cell transmission control section 12 transmits ATM cells from the output port corresponding logical queues 11-1 to 11-n and then, computes the next time for transmitting ATM cells from the same logical queues by the next transmission time computing section 12e, and has the logical queue list 12b in which logical queues to be transmitted are arranged in order of time.

ATM cells fetched from the output port corresponding logical queues 11-1 to 11-n located at the head of the logical queue list 12b are stored in the output port buffers 2-1 to 2-n corresponding to their destination output ports via the input port signal line 101 and time-division multiplexing bus 102 from the cell transmitting section 12d of the cell transmission control section 12. The output port buffers 2-1 to 2-n successively transmit the ATM cells to the output ports 103-1 to 103-n starting with the first ATM cell.

FIG. 3 is an illustration showing an example of the logical queue list 12b of the cell transmission control section 12 in FIG. 1. In FIG. 3, the logical queue list 12b holds the position (first, second, or third), transmission time, class, and destination port of the logical queue on the list.

The next transmission time computing section 12e of the cell transmission control section 12 transmits ATM cells from the output port corresponding logical queues 11-1 to 11-n respectively and then, computes the next transmission time for transmitting ATM cells from the same output port corresponding logical queues 11-1 to 11-n. An example of the computation method is shown below.

For example, when assuming the last computed time for outputting an ATM cell from a logical queue as Tprev and the band on a destination output port assigned to each connection stored in a logical queue as BWi, the next transmission time Tnext is computed in accordance with the following expression (1).

$$Tnext = Tprev + 1/\Sigma BWi \tag{1}$$

In this case, the band BWi assigned to each connection is determined by call acceptance control before the connection is set so that the sum of assigned bands to which all connections via a destination output port does not exceed the maximum band.

When performing transmission control by equalizing a transmission interval (=Tnext−Tprev) with the inverse number of a band assigned so that a destination output port is not congested and thereby, strictly comparing a transmission time with the present time, the destination output port is not congested at all.

FIG. 4 is an illustration showing an example of the information contents (buffer occupancy value table) of the buffer occupancy value measuring section 3 in FIG. 1. In FIG. 4, the occupancy value (queue length) of each of the output port buffers 2-1 to 2-n measured by the buffer occupancy value measuring section 3 is stored in a buffer occupancy value table 3a corresponding to each of the output port buffers 2-1 to 2-n.

FIG. 5 is an illustration showing an example of threshold setting in the output port buffer 2-1 in FIG. 1. In FIG. 5, a threshold Qth_shape for the back-pressure outputting section 4 to output a transmission control (SHAPE) signal 112 and a threshold Qth_stop for the back-pressure outputting section 4 to a transmission stop (STOP) signal 113 are sent to the output port buffer 2-1.

Figure 6A:
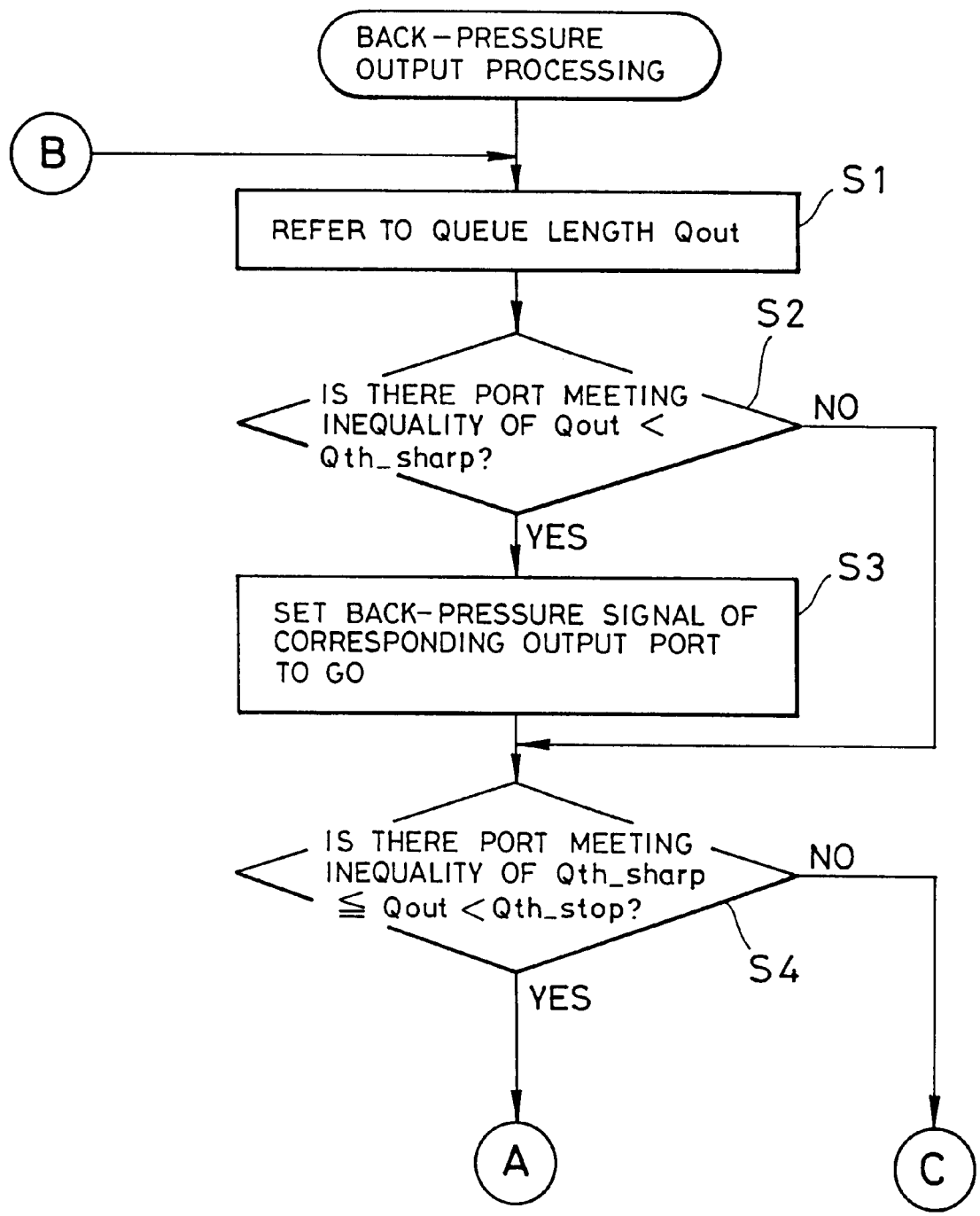
FIGS. 6A and 6B are flow charts showing the back pressure control by the back-pressure outputting section in FIG. 1.
Figure 6B:
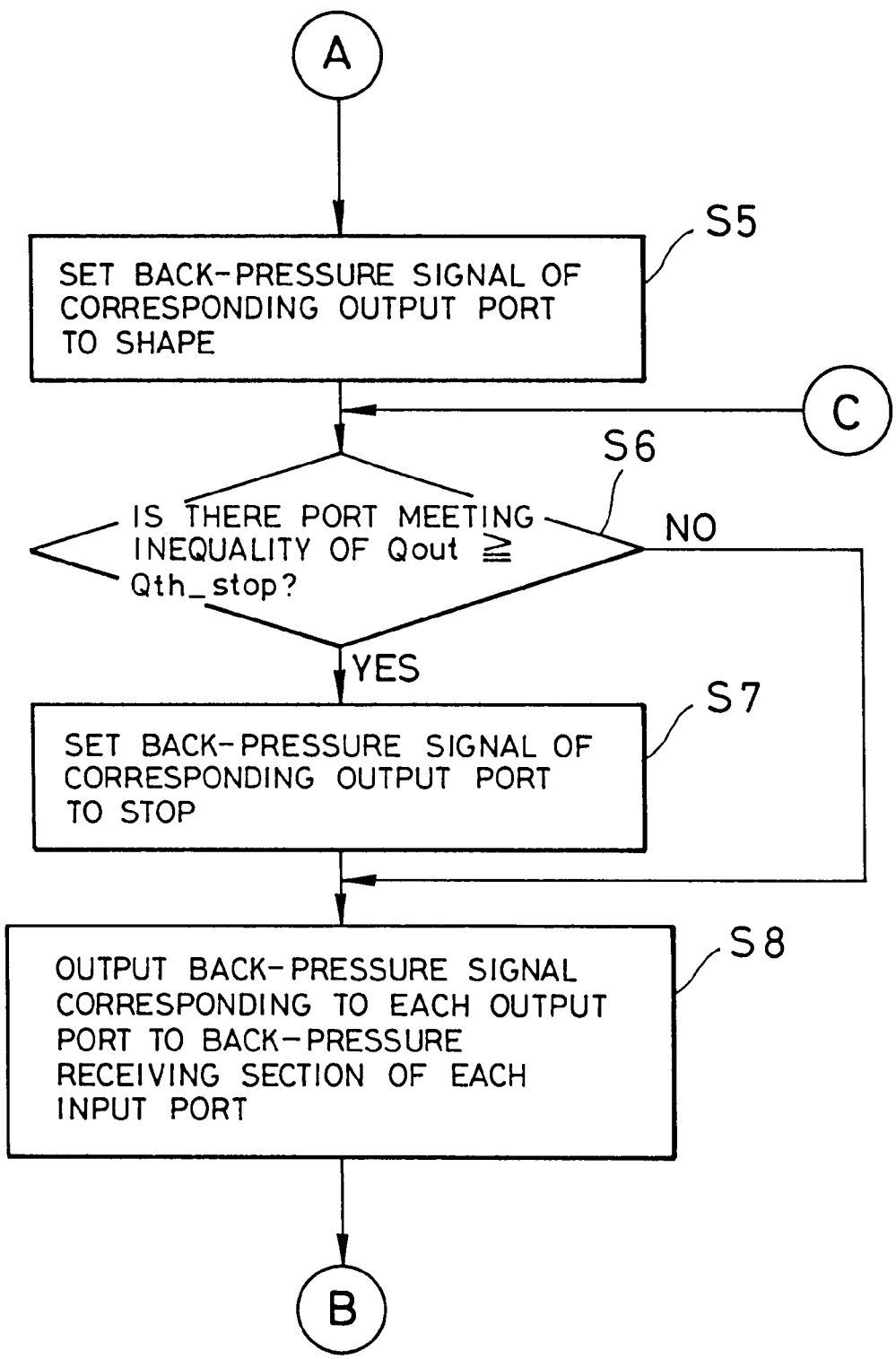

FIGS. 6A and 6B are flowcharts showing the back pressure control by the back-pressure outputting section 4 in FIG. 1 and FIGS. 7A, 7B and 7C are flow charts showing the cell transmission control by the cell transmission control section 12 in FIG. 1. While referring to FIGS. 1 to 7, the cell transmission control according to an embodiment of the present invention is described below. To simplify the description, it is assumed that only one traffic class is present.

The input port buffer 1 identifies the destination output ports of the ATM cells incoming from the input port 100 by the separator 10 for each port and stores them in proper output port corresponding logical queues 11-1 to 11-n in accordance with the identified results.

The cell transmission control section 12 transmits ATM cells from the output port corresponding logical queues 11-1 to 11-n and then, computes the next time for transmitting ATM cells from the same logical queues by the next transmission time computing section 12e and has the logical queue list 12b in which logical queues to be transmitted are arranged in order to time.

The ATM cells fetched from the output port corresponding logical queues 11-1 to 11-n located at the head of the logical queue list 12b are stored in the output port buffers 2-1 to 2-n corresponding to their destination output ports from the cell transmitting section 12d of the cell transmission control section 12 via the input-port signal line 101 and the time-division multiplexing bus 102. The output port buffers 2-1 to 2-n successively transmit the ATM cells to the output ports 103-1 to 103-n starting with the first ATM cell.

The buffer occupancy value measuring section 3 measures the occupancy value (queue length) of each of the output port buffers 2-1 to 2-n and stores the measured queue lengths in the buffer occupancy value table 3a corresponding to the output port buffers 2-1 to 2-n respectively.

The back-pressure outputting section 4 refers to queue lengths Qout in the buffer occupancy value table 3a of the buffer occupancy value measuring section 3 (step S1 in FIG. 6A) to judge whether the output port buffers 2-1 to 2-n having a queue length Qout equal to or less than the threshold Qth_shape prepared for the output ports 103-1 to 103-n respectively are present (step S2 in FIG. 6A).

When the output port buffers 2-1 to 2-n having a queue length Qout equal to or less than the threshold Qth_shape are present, the back-pressure outputting section 4 uses back pressure signals for the corresponding output ports 103-1 to 103-n as the transmission restart (GO) signal 111 (step S3 in FIG. 6A).

Unless there are the output port buffers 2-1 to 2-n having a queue length Qout equal to or less than the threshold Qth_shape, the back-pressure outputting section 4 judges whether the output port buffers 2-1 to 2-n having a queue length Qout between the threshold Qth_shape and the threshold Qth_stop are present (step S4 in FIG. 6A).

When the output port buffers 2-1 to 2-n having a queue length Qout between the threshold Qth_shape and the threshold Qth_stop are present, the back-pressure outputting section 4 uses back pressure signals for the corresponding output ports 103-1 to 103-n as the transmission control (SHAPE) signal 112 (step S5 in FIG. 6B).

Unless the output port buffers 2-1 to 2-n having a queue length Qout between the threshold Qth_shape and the threshold Qth_stop are present, the back-pressure outputting section 4 judges whether the output port buffers 2-1 to 2-n having a queue length Qout equal to or more than the threshold Qth_stop are present (step S6 in FIG. 6B).

When the output port buffers 2-1 to 2-n having a queue length Qout equal to or more than the threshold Qth_stop are present, the back-pressure outputting section 4 uses back pressure signals for the corresponding output ports 103-1 to 103-n as the transmission stop (STOP) signal 113 (step S7 in FIG. 6B).

Unless the output port buffers 2-1 to 2-n having a queue length Qout equal to or more than the threshold Qth_stop are present or when back pressure signals for the corresponding output ports 103-1 to 1-3-n are used as the transmission stop (STOP) signal 113, the back-pressure outputting section 4 outputs the back pressure signals corresponding to the output ports 103-1 to 103-n to all the input port buffers 1 (step S8 in FIG. 6B).

When the back-pressure receiving section 13 of the input port buffer 1 receives back pressure signals from the back-pressure outputting section 4, the section 13 stores the back pressure signals in a back-pressure-signal receiving state (not illustrated) by making them correspond to the output ports 103-1 to 103-n and communicates instructions (restart, control, and stop) corresponding to the back pressure signals to the cell transmission control section 12.

The cell transmission control section 12 refers to the head of the logical queue list 12b (step S11 in FIG. 7A) and refers to the instruction from the back-pressure receiving section 13 corresponding to the destination port of the logical queue entered in the head of the logical queue list 12b (step S12 in FIG. 7A).

When the instruction from the back-pressure receiving section 13 corresponding to the destination port of the logical queue entered in the head of the logical queue list 12b is an restart instruction (step S13 in FIG. 7A), the cell transmission control section 12 transmits the ATM cell of the logical queue entered in the head of the logical queue list 12 (step S14 in FIG. 7A). In this case, the cell transmission control section 12 does not compare the transmission time of the ATM cell with the present time.

Figure 7B:
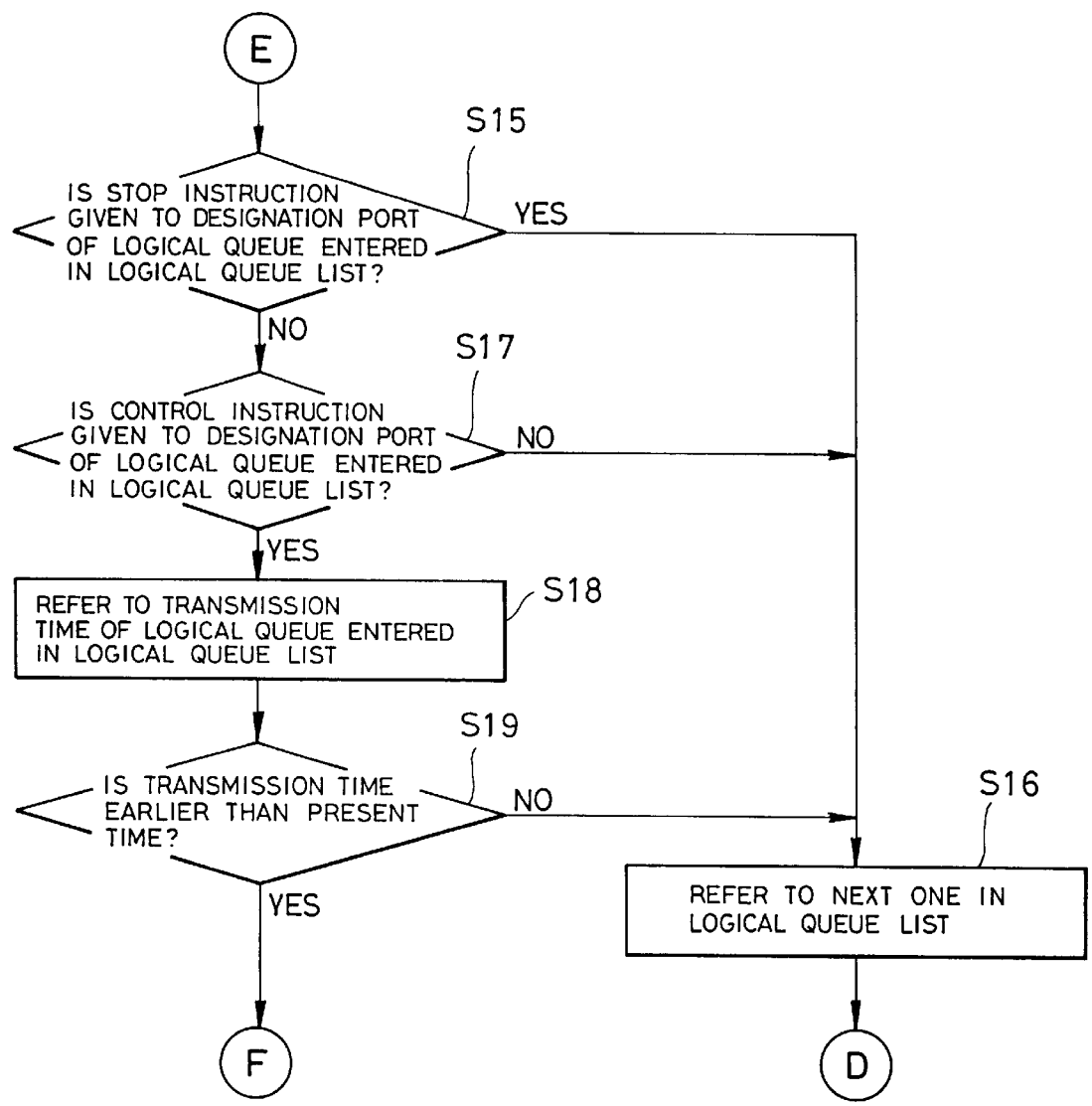

When the instruction from the back-pressure receiving section 13 corresponding to the destination port of the logical queue entered in the head of the logical queue list 12b is a stop instruction (step S15 in FIG. 7B) or the instruction is not a control instruction (step S17 in FIG. 7B), the cell transmission control section 12 refers to the next one in the logical queue list 12b (step S16 in FIG. 7B).

That is, when the instruction from the back-pressure receiving section 13 is a stop instruction, the cell transmission control section 12 completely stops the transmission of ATM cells to their destination port and refers to the next one in the logical queue list 12b. Moreover, when the instruction from the back-pressure receiving section 13 is not any one of a restart instruction, stop instruction, and control instruction, the cell transmission control section 12 decides the instruction as an error and refers to the next one in the logical queue list 12b.

When the instruction from the back-pressure receiving section 13 corresponding to the destination port of the logical queue entered in the head of the logical queue list 12b is a control instruction (step S17 in FIG. 7B), the cell transmission control section 12 refers to the transmission time of the logical queue entered in the head of the logical queue list 12b (step S18 in FIG. 7B) and transmits the ATM cell only when the transmission time is earlier than the present time sent from the clock section 12g (step S19 in FIG. 7B and step S20 in FIG. 7C). When the transmission time is not earlier than the present time, the cell transmission control section 12 refers to the next one in the logical queue list 12b (step S16 in FIG. 7B).

Under an environment in which a plurality of traffic classes are present, it is possible to perform the control corresponding to various traffic-class quality requests by preparing an independent output port buffer for each traffic class or preparing a threshold of each back-pressure signal for every traffic class.

As described above, when the output port buffers 2-1 to 2-n are not congested, the ATM switchboard of an embodiment of the present invention makes it possible to improve the utilization efficiency of the output port buffers 2-1 to 2-n by making the cell transmission control by each input port buffer 1 independent of the present time and thereby excessively transmitting ATM cells.

Moreover, by first outputting the transmission control (SHAPE) signal 112 to the congested output port buffers 2-1 to 2-n and strictly comparing the cell transmission control by each input port buffer 1 with the present time to prevent the total number of cells addressed to the output ports 103-1 to 103-n of the input port buffer 1 from exceeding the maximum band and thereby, assuring the minimum band assigned through the call acceptance control, the output port buffers 2-1 to 2-n are not further congested and therefore, it is possible to greatly decrease the output frequency of the transmission stop (STOP) signal 113. Thereby, it is possible to prevent the band non-assurance problem due to throughput averaging between the input port buffers 1 which has been serious so far in the case of the back pressure control only by the transmission restart (GO) signal 111 and the transmission stop (STOP) signal 113 from occurring.

Figure 8:
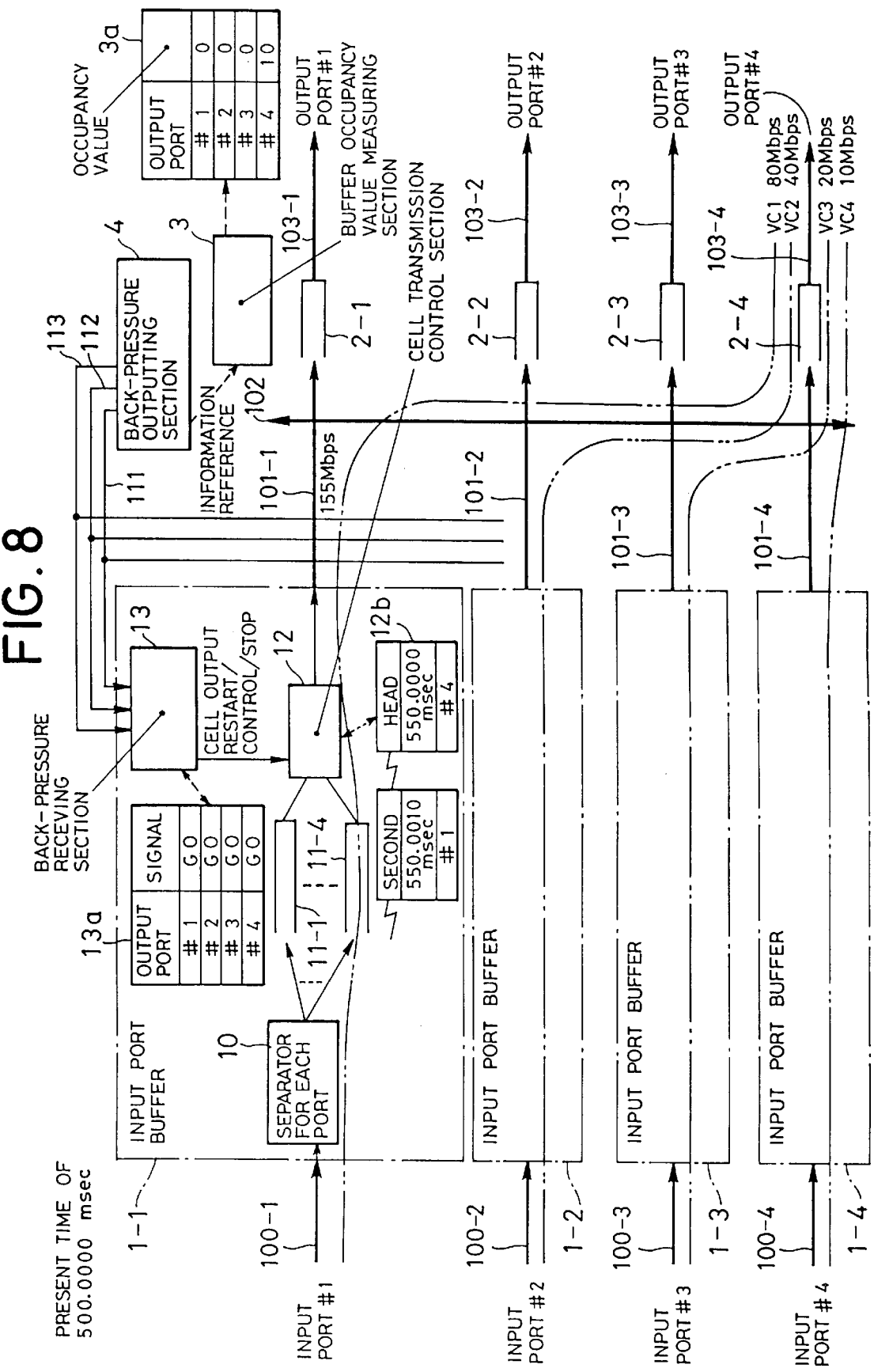
FIG. 8 is a state diagram for explaining the processing procedure when the queue length of an output port of the ATM switchboard in FIG. 1 is equal to or less than the threshold for generating a transmission control (SHAPE) signal.
Figure 9:
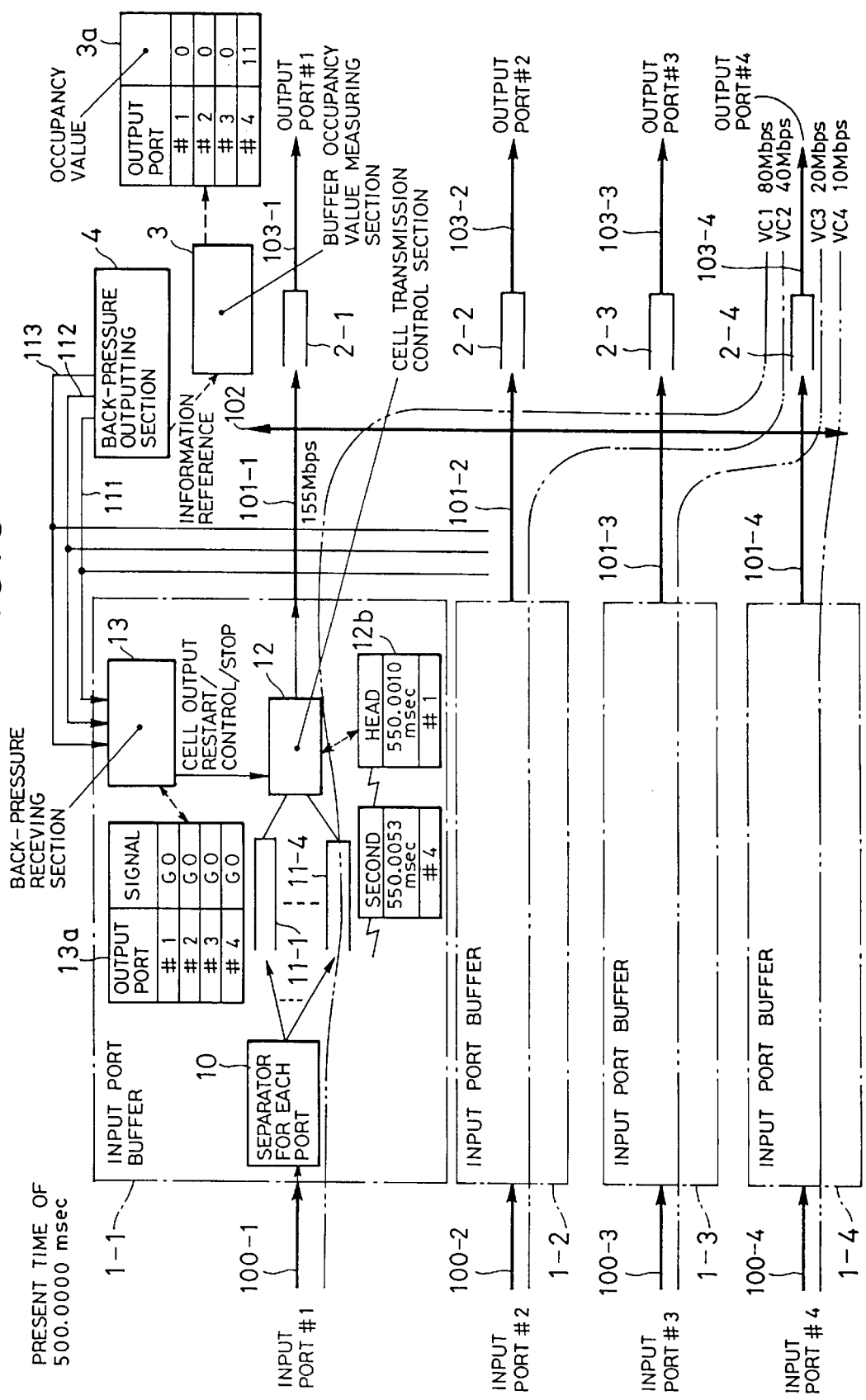
FIG. 9 is a state diagram for explaining the processing procedure when the queue length of an output port of the ATM switchboard in FIG. 1 is equal to or less than the threshold for generating a transmission control (SHAPE) signal.

FIGS. 8 and 9 are state diagrams for explaining a processing procedure by the ATM switchboard shown in FIG.

Figure 10:
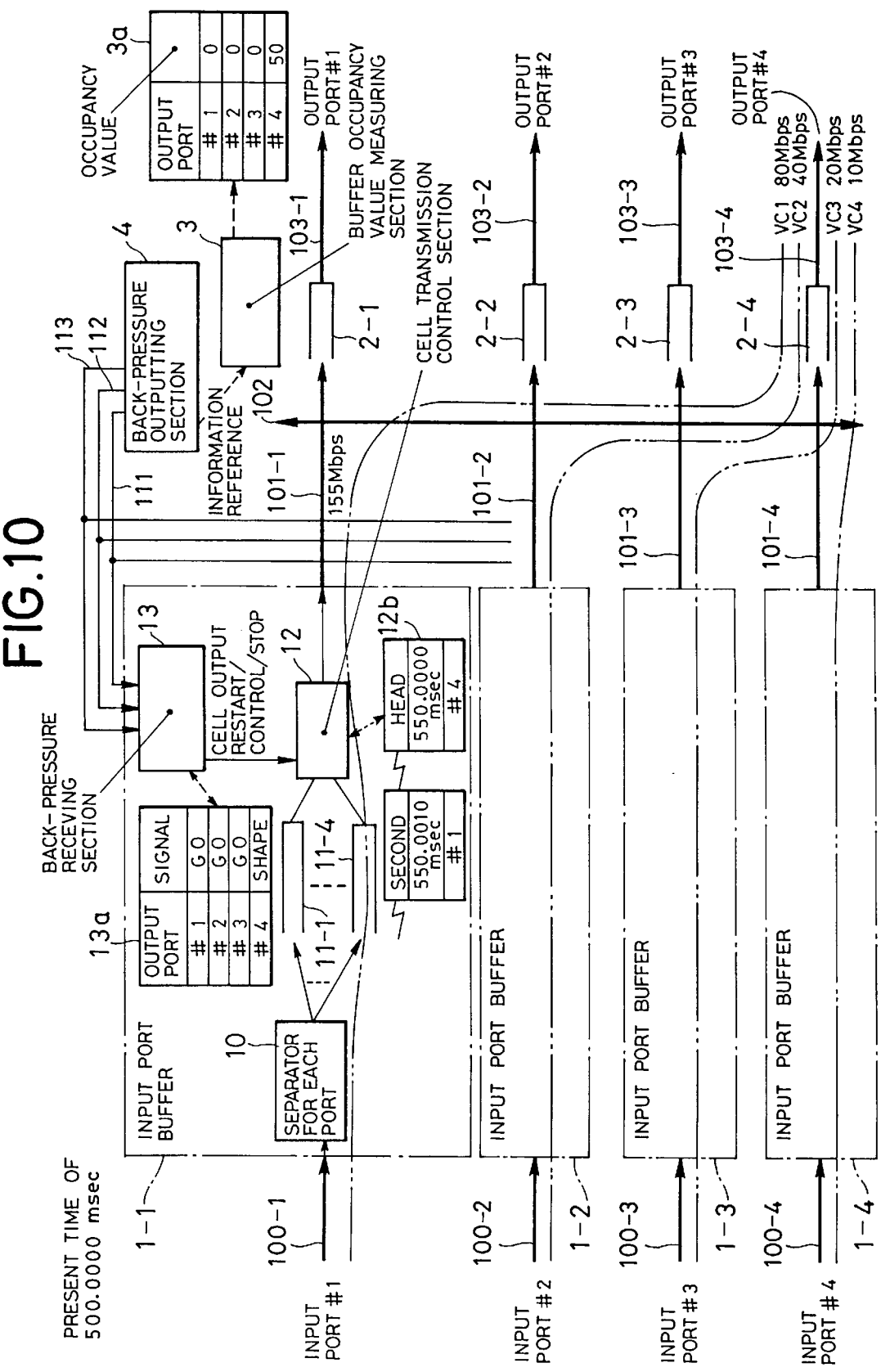
FIG. 10 is a state diagram for explaining the processing procedure when the queue length of an output port of the ATM switchboard in FIG. 1 is equal to or more than the threshold for generating a transmission control (SHAPE) signal and equal to or less than the threshold for generating a transmission stop (STOP) signal.
Figure 11:
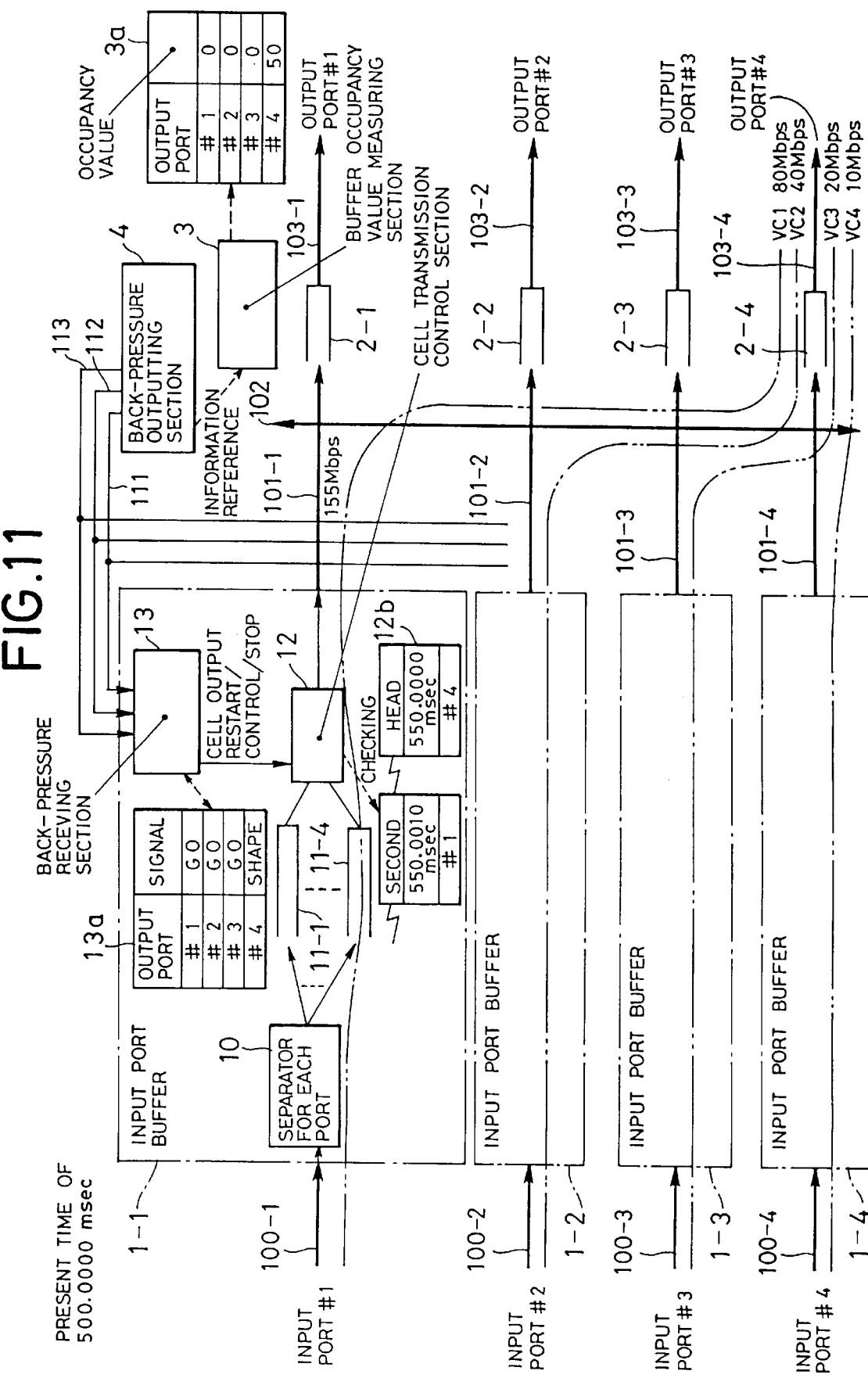
FIG. 11 is a state diagram for explaining the processing procedure when the queue length of an output port of the ATM switchboard in FIG. 1 is equal to or more than the threshold for generating a transmission control (SHAPE) signal and equal to or less than the threshold for generating a transmission stop (STOP) signal.

1 when the queue length Qout of an output port #4 is equal to or less than a threshold Qth_shape for generating a transmission control (SHAPE) signal and FIGS. 10 and 11 are state diagrams for explaining a processing procedure by the ATM switchboard shown in FIG. 1 when a queue length Qout of an output port #4 is equal to or more than a threshold Qth_shape for generating a transmission control (SHAPE) signal and equal to or less than a threshold Qth_stop for generating a transmission stop (STOP) signal.

Figure 12:
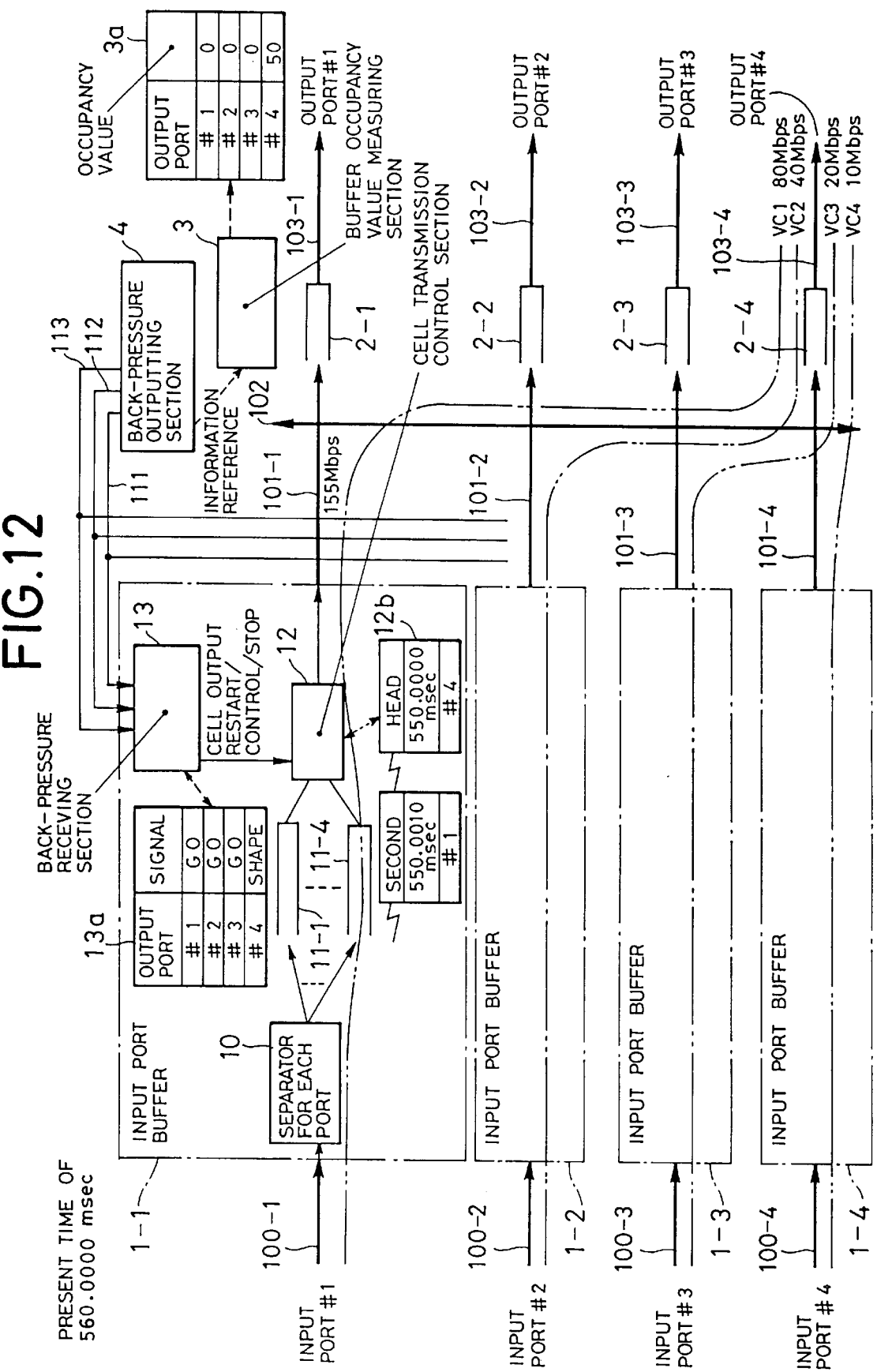
FIG. 12 is a state diagram for explaining the processing procedure when the queue length of an output port of the ATM switchboard in FIG. 1 is equal to or more than the threshold for generating a transmission control (SHAPE) signal and equal to or less than the threshold for generating a transmission stop (STOP) signal.
Figure 13:
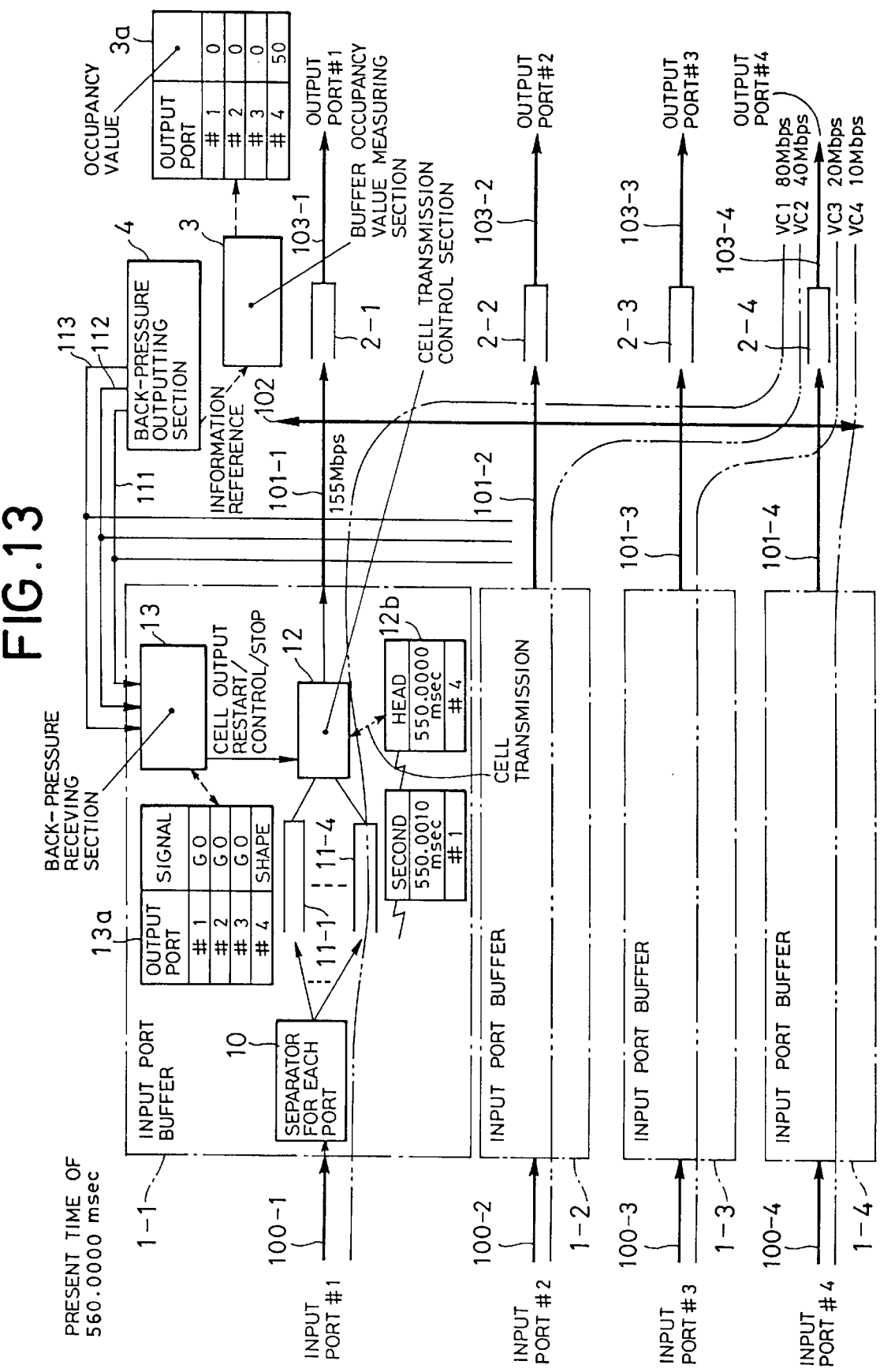
FIG. 13 is a state diagram for explaining the processing procedure when the queue length of an output port of the ATM switchboard in FIG. 1 is equal to or more than the threshold for generating a transmission control (SHAPE) signal and equal to or less than the threshold for generating a transmission stop (STOP) signal.
Figure 14:
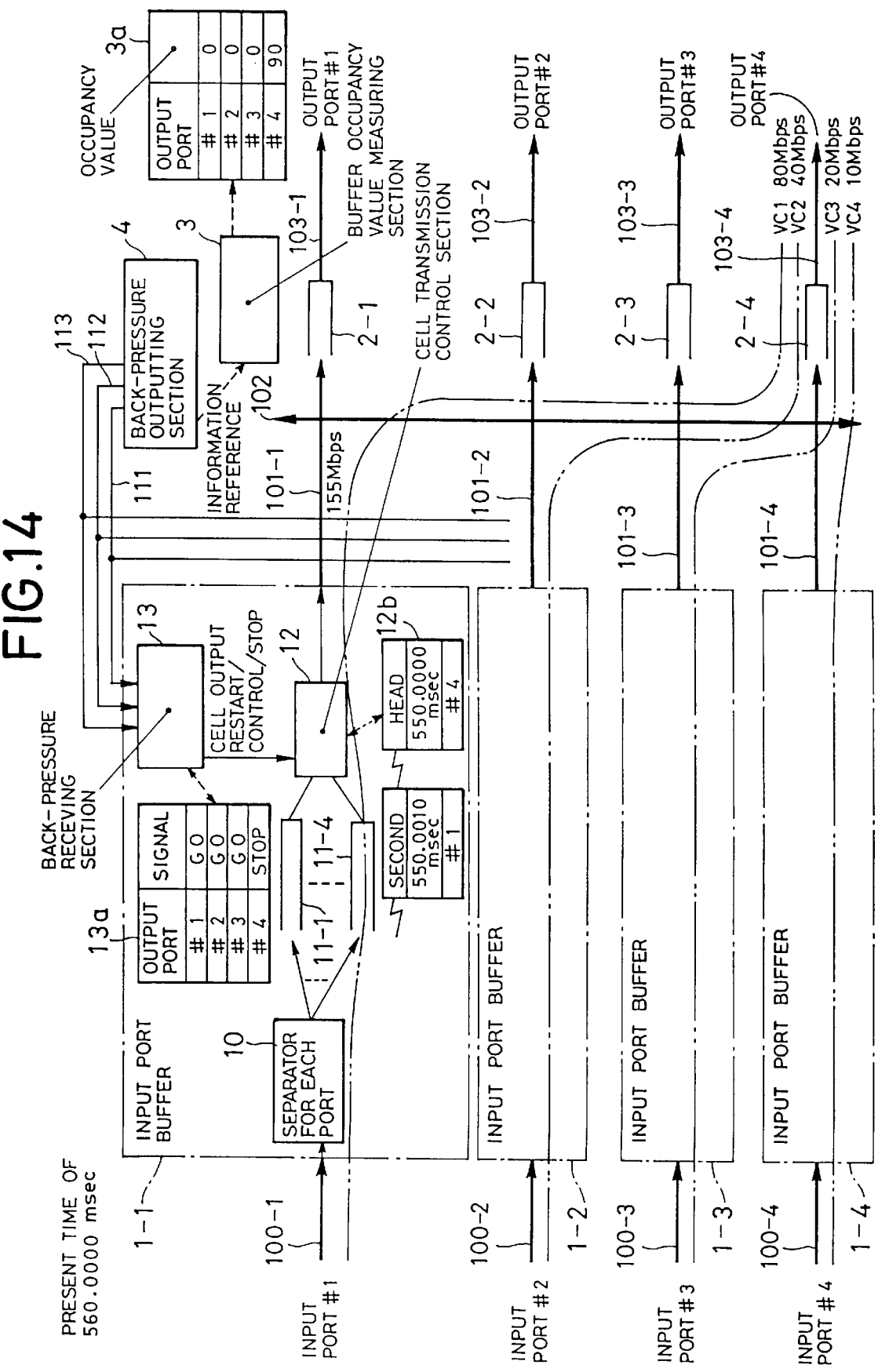
FIG. 14 is a state diagram for explaining the processing procedure when the queue length of an output port of the ATM switchboard in FIG. 1 is equal to or more than the threshold for generating a transmission stop (STOP) signal.
Figure 15:
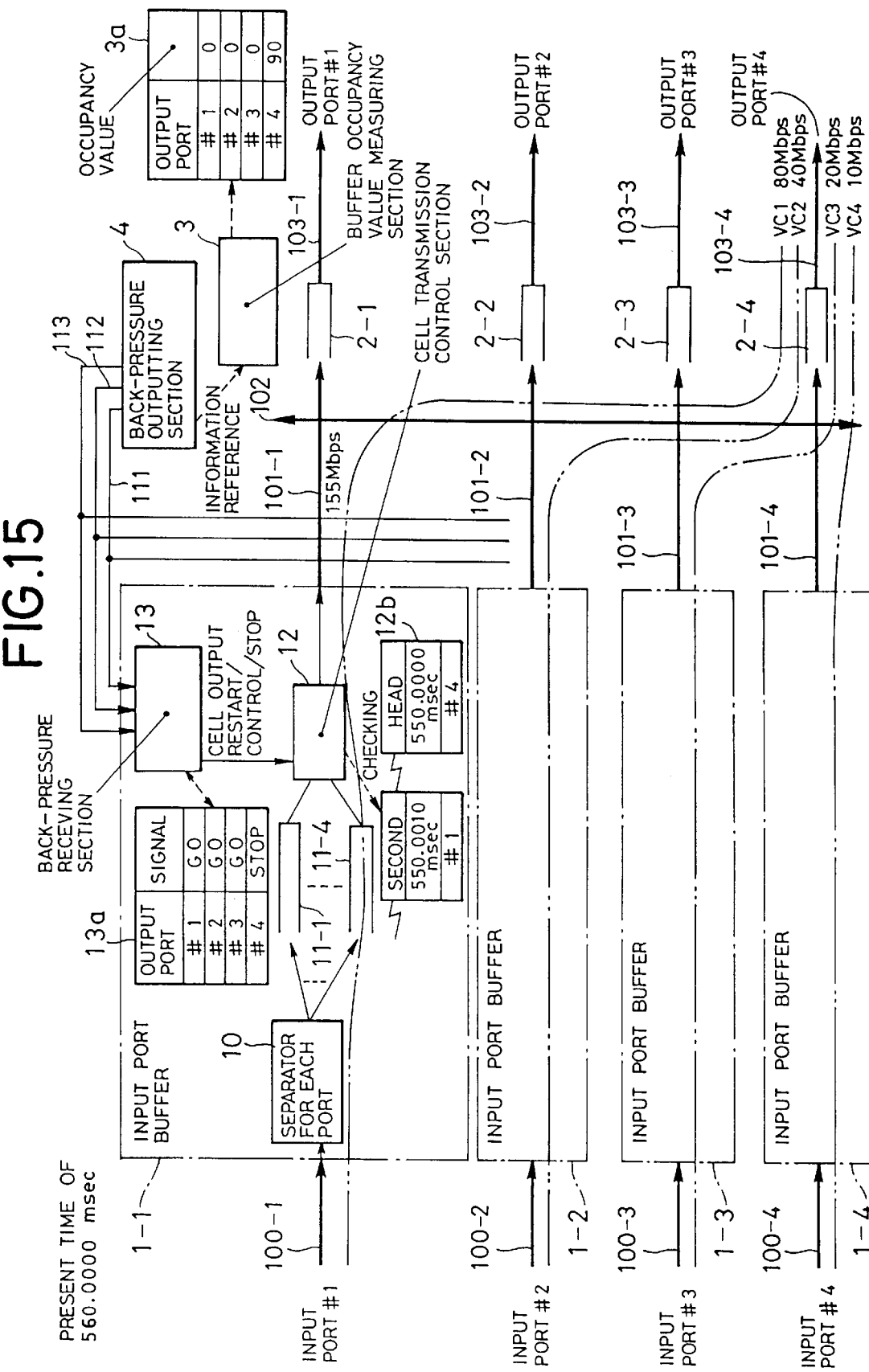
FIG. 15 is a state diagram for explaining the processing procedure when the queue length of an output port of the ATM switchboard in FIG. 1 is equal to or more than the threshold for generating a transmission stop (STOP) signal.
Figure 16:
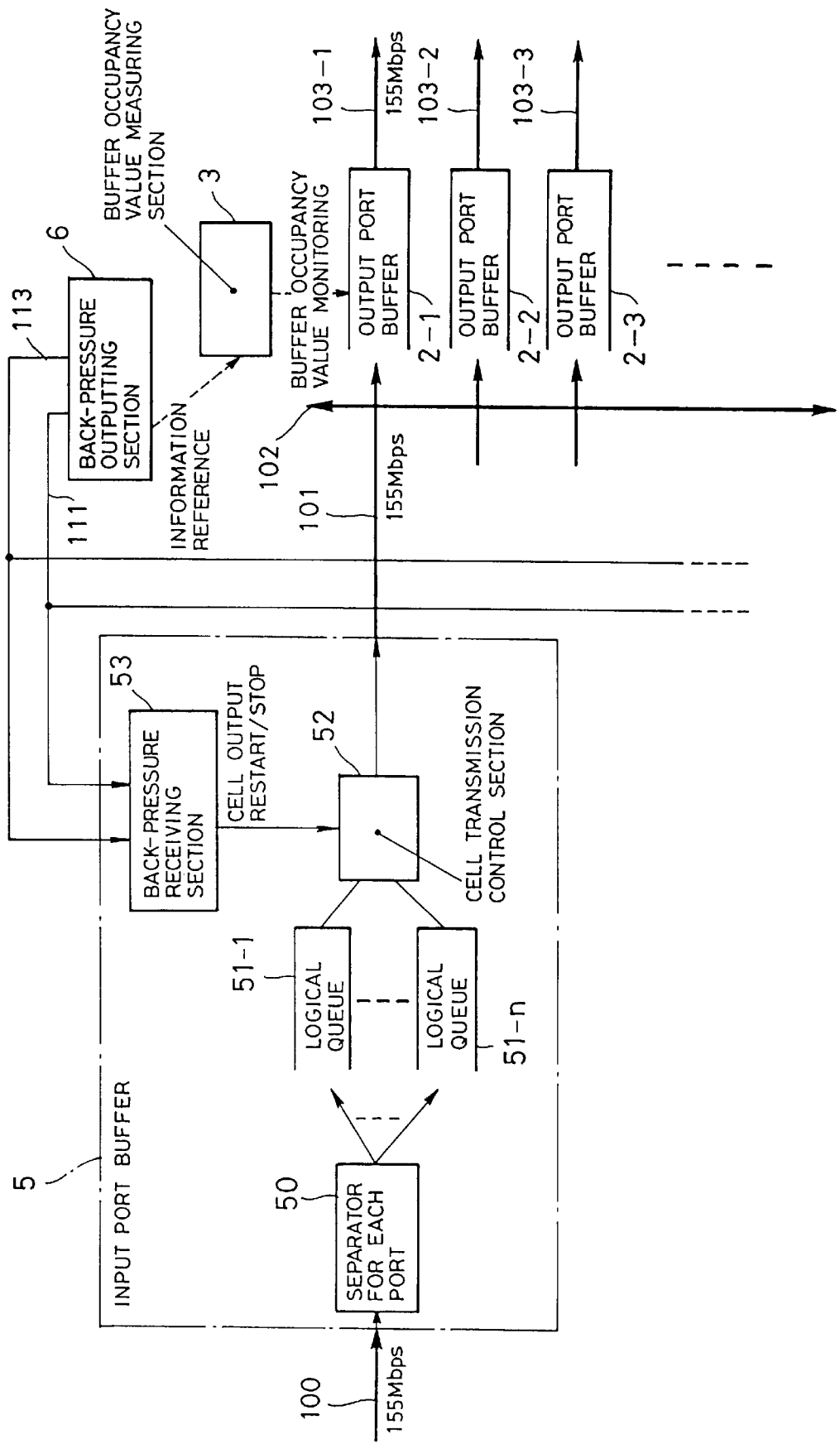
FIG. 16 is a block diagram showing the structure of an conventional example.
Figure 17:
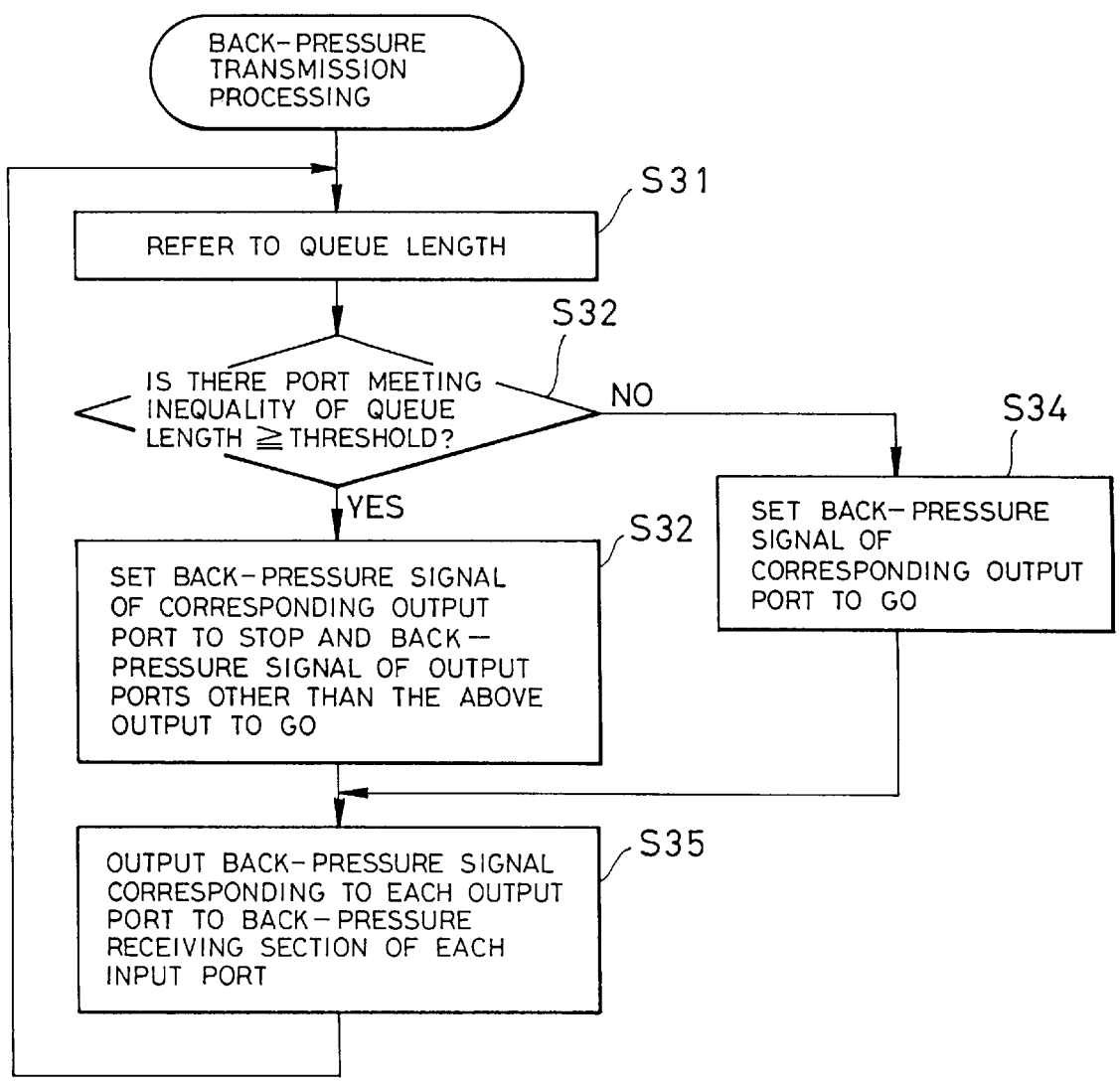
FIG. 17 is a flow chart showing the back pressure control by the back-pressure outputting section in FIG. 16.

Moreover, FIGS. 12 and 13 are state diagrams for explaining a processing procedure by the ATM switchboard shown in FIG. 1 when a queue length Qout of an output port #4 is equal to or more than a threshold Qth_shape for generating a transmission control (SHAPE) signal and equal to or less than a threshold Qth_stop for generating a transmission stop (STOP) signal and FIGS. 14 and 15 are state diagrams for explaining a processing procedure by the ATM switchboard shown in FIG. 1 when a queue length Qout of an output port #4 is equal to or more than a threshold Qth_stop for generating a transmission stop (STOP) signal.

The cell transmission control by an embodiment of the present invention is specifically described below by referring to FIGS. 8 to 15. In FIGS. 8 to 15, the ATM switchboard of an embodiment of the present invention including input ports 100-1 to 100-4 and output ports 103-1 to 103-4 uses 40 cells for the threshold Qth_shape for outputting the transmission control(SHAPE) signal 112 and 80 cells for the threshold Qth_stop for outputting the transmission stop (STOP) signal 113 from the output port buffers 2-1 to 2-n respectively.

Moreover, connections are used from the input ports (#1 to #4) 100-1 to 100-4 to the output port (#4) 103-4 one each. In the case of each reserved band, 80 Mbps (=188.4 cells/msec) is applied between the input port (#1) and the output port (#4)(VC1), 40 Mbps (=94.2 cells/msec) is applied between the input port (#2) and the output port (#4)(VC2), 20 Mbps (=47.1 cells/msec) is applied between the input port (#3) and the output port (#4)(VC3), and 10 Mbps (=23.6 cells/msec) is applied between the input port (#4) and the output port (#4)(VC4). The input ports 1-2 and 1-4 have the same structure as the input port 1-1 and the above band information is previously stored in the band table 12f of the cell transmission control section 12.

FIGS. 8 and 9 show the state when a logical queue (transmission time t=550.0000 msec) addressed to the output port (#4) in which the connection VC1 set between the input port (#1) and the output port (#4) is stored reaches the head of the logical queue list 12b of the cell transmission control section 12 of the input port (#1) at the present time (t=500.0000 msec).

In this case, because there is not any other connection bound for the output port (#4) from the input port (#1), only the connection VC1 is stored in the logical queue. When referring to a back-pressure receiving state 13a of the back-pressure receiving section 13, neither transmission control (SHAPE) signal 112 nor transmission stop (STOP) signal 113 are received from the output port (#4) [the queue length of the output port (#4) is 10 cells]. Therefore, the cell transmission control section 12 fetches an ATM cell from a logical queue in which VC1 is stored without comparing a transmission time with the present time and stores the ATM cell in the destination output port buffer 2-4 via the time division bus 102.

The next transmission time Tnext of a logical queue addressed to the output port (#4) present at the head of the logical queue list 12b is computed by the next transmission time computing section 12e in accordance with the expression (1). That is, the next transmission time Tnext is obtained as shown below.

Tnext=550.0000 msec+1/188.4 cells/msec=550.0053 msec

The cell transmission control section 12 instructs the logical queue list control section 12c to re-sort data in the logical queue list 12b in order of transmission time in accordance with the next transmission time Tnext computed by the next transmission time computing section 12e.

FIGS. 10 and 11 show the state when a logical queue (transmission time t=550.0000 msec) addressed to the output port (#4) in which the connection VC1 set between the input port (#1) and the output port (#4) is stored reaches the head of the logical queue list 12b of the cell transmission control section 12 of the input port (#1) at the present time (t=500.0000 msec).

In this case, because there is not any other connection bound for the output port (#4) from the input port (#1), only the connection VC1 is stored in the logical queue. When referring to the back-pressure receiving state 13a of the back-pressure receiving section 13, the transmission control (SHAPE) signal 112 is received from the output port (#4) [the queue length of the output port (#4) is 50 cells]. Therefore, the cell transmission control section 12 compares a transmission time with the present time.

In this case, because the transmission time (t=550.0000 msec) is later than the present time (t=500.0000 msec), the cell transmission control section 12 does not transmit any ATM cell to the output port (#4) from the logical queue but it checks the next entry in the logical queue list 12b.

FIGS. 12 and 13 show the state when a logical queue (transmission time t=550.0000 msec) addressed to the output port (#4) in which the connection VC1 set between the input port (#1) and the output port (#4) is stored reaches the head of the logical queue list 12b of the cell transmission control section 12 of the input port (#1) at the present time (t=560.0000 msec).

In this case, because there is not any other connection bound for the output port (#4) from the input port (#1), only the connection VC1 is stored in the logical queue. When referring to the back-pressure receiving state 13a of the back-pressure receiving section 13, the transmission control (SHAPE) signal 112 is received from the output port (#4) [the queue length of the output port (#4) is 50 cells]. Therefore, the cell transmission control section 12 compares a transmission time with the present time.

In this case, because the transmission time (t=550.0000 msec) is earlier than the present time (t=560.0000 msec), the cell transmission control section 12 transmits an ATM cell to the output port (#4) from the logical queue and then, computes the next transmission time and re-sorts data in the logical queue list 12b in order of transmission time.

FIGS. 14 and 15 show the state when a logical queue (transmission time t=550.0000 msec) addressed to the output port (#4) in which the connection VC1 set between the input port (#1) and the output port (#4) is stored reaches the head of the logical queue list 12b of the cell transmission control section 12 of the input port (#1) at the present time (t=560.0000 msec).

In this case, because there is not any other connection bound for the output port (#4) from the input port (#1), only the connection VC1 is stored in the logical queue. When referring to the back-pressure receiving state 13a of the back-pressure receiving section 13, the control stop (STOP) signal 113 is received from the output port (#4) [the queue length of the output port (#4) is 90 cells]. Therefore, the cell transmission control section 12 does not transmit any ATM cell from the logical queue to the output port (#4) but it checks the next entry in the logical queue list 12b.

Thus, when the output port buffers 2-1 to 2-n are not congested, it is possible to improve the utilization efficiency of the output port buffers 2-1 to 2-n by making the cell transmission control by each of the input port buffers 1 and 1-1 to 1-4 independent of the present time and thereby, excessively transmitting ATM cells.

Moreover, when the output port buffers 2-1 to 2-n are congested, the transmission control (SHAPE) signal 112 is output and the cell transmission control by each of the input port buffers 1 and 1-1 to 1-4 is strictly compared with the present time so that the total number of cells addressed to the output ports 103-1 to 103-n corresponding to the congested output port buffers 2-1 to 2-n does not exceed the maximum band. Thereby, by assuring the minimum band assigned by the call acceptance control, the output port buffers 2-1 to 2-n are not further congested and thus, it is possible to greatly decrease the output frequency of the transmission stop (STOP) signal 113.

Thereby, it is possible to prevent the band non-assurance problem due to throughput averaging between the input port buffers 1 and 1-1 to 1-4 which has been serious so far in the case of the back pressure control only by the transmission restart (GO) signal 111 and the transmission stop (STOP) signal 113.

As described above, according to the present invention, a switch control circuit of an ATM switchboard for switching ATM cells transferred in an asynchronous mode between an input port and an output port realizes the traffic control for controlling occurrence of congestion in the ATM switchboard and assuring the throughput of VCs using the same output port by using an input port buffer and an output port buffer for exchanging ATM cells between the input port and the output port, outputting any one of a transmission restart signal, transmission stop signal, and transmission control signal from a back-pressure function in accordance with an output port buffer occupancy value in order to prevent cells from being disused in the output port buffer, and performing control so as to transmit ATM cells at a preset first rate to the output port when a transmission restart signal is input from the back pressure function correspondingly to the output port for transmitting ATM cells, and moreover performing control so as to transmit ATM cells at a preset second rate to the output port when a transmission control signal is input from the back pressure function correspondingly to an output port for transmitting ATM cells.

What is claimed is:

1. A switch control circuit of an ATM switchboard for switching ATM cells transferred in an asynchronous mode between an input port and an output port, said circuit comprising, an input port buffer and an output port buffer corresponding to said input port and said output port respectively to perform ATM cell exchange between said input port and said output port;

a back-pressure determination device outputting any one of a transmission restart signal, transmission stop signal, and transmission control signal in accordance with an occupancy value of said output port buffer to prevent cells from being inefficiently used by said output port buffer; and, a cell transmission controller, controlling transmission of said ATM cells at a preset first rate to an output port when said transmission restart signal is input from said back-pressure determination device corresponding to said output port and transmission of said ATM cells at a preset second rate to an output port when said transmission control signal is input from said back-pressure determination device corresponding to said output port.

2. The switch control circuit according to claim 1, wherein said back pressure determination device is constituted so as to output any one of said transmission restart signal, said transmission stop signal, and said transmission control signal corresponding to said output port.

3. The switch control circuit according to claim 1, wherein said back pressure determination device is constituted so as to output said transmission restart signal when the occupancy value of said output port buffer is less than a preset first threshold, said transmission control signal when the occupancy value of said output port buffer is between said first threshold and a preset second threshold, and said transmission stop signal when the occupancy value of said output port buffer is equal to or more than said second threshold.

4. The switch control circuit according to claim 1, wherein said cell transmission controller includes comparison means for comparing the present time with a scheduled transmission time computed in accordance with said second rate when transmitting said ATM cells at said second rate and means for performing control so as to transmit said ATM cells by said comparison means when said scheduled transmission time is earlier than said present time.

5. The switch control circuit according to claim 1, wherein said cell transmission controller includes means for performing control so as to transmit said ATM cells at the maximum rate in order of scheduled transmission time computed in accordance with said second rate independently of the present time when transmitting said ATM cells at said first rate.

6. The switch control circuit according to claim 1, wherein said cell transmission controller includes time computing means for computing a scheduled transmission time of an ATM cell to be transmitted next time after transmitting said ATM cells.

7. The switch control circuit according to claim 1, wherein said cell transmission controller has a list in which said ATM cells to be transmitted are arranged in order of scheduled transmission time and controls the transmission of an ATM cell at the head of the list in accordance with a signal obtained from said back pressure determination device.

8. The switch control circuit according to claim 3, wherein said back pressure determination device first checks whether there is said output port buffer having an occupancy value less than said first threshold, then checks whether there is said output port buffer having an occupancy value between said first threshold and said second threshold, and finally checks whether there is said output port buffer having an occupancy value equal to or more than said second threshold.

9. The switch control circuit according to claim 8, wherein said back pressure determination device outputs a transmission stop signal corresponding to said output port buffer to said cell transmission controller when there is said output port buffer having an occupancy value equal to or more than the said second threshold and thereafter, outputs any one of said transmission restart signal, said transmission stop signal, and said transmission control signal corresponding to each output port buffer again.

10. The switch control circuit according to claim 8, wherein said back pressure determination device outputs any one of said transmission restart signal, said transmission stop signal, and said transmission control signal corresponding to each output port buffer again when there is not said output buffer having an occupancy value equal to or more than said second threshold.

11. The switch control circuit according to claim 7, wherein said transmission controller stop the transmission of said ATM cells and controls the transmission of an ATM cell next located in said list in accordance with a signal obtained from said back pressure determination device when said transmission stop signal is input to said cell transmission control means by said back pressure function.

12. The switch control circuit according to claim 7, wherein said cell transmission controller decides a case in which said transmission restart signal, said transmission stop signal, or said transmission control signal is not input to said cell transmission controller by said back pressure determination device as an error and controls the transmission of an ATM cell next located in said list in accordance with a signal obtained from said back pressure determination device.

13. A switch control method of an ATM switchboard for switching an ATM cell transferred in an asynchronous mode between an input port and an output port, the method comprising the first step of outputting any one of a transmission restart signal, transmission stop signal, or transmission control signal in accordance with an occupancy value of said output port buffer in order to prevent cells in said output port buffer corresponding to said output port from being inefficiently used and the second step of performing control so as to transmit said ATM cell at a preset first rate to an output port for transmitting said ATM cell when said transmission restart signal is input in said first step corresponding to said output port and transmitting said ATM cell to an output port for transmitting said ATM cell at a preset second rate when said transmission control signal is input in said first step corresponding to said output port.

14. The switch control method according to claim 13, wherein said first step is constituted so as to output any one of said transmission restart signal, said transmission stop signal, and said transmission control signal corresponding to said output port.

15. The switch control method according to claim 13, wherein said first step is constituted so as to output said transmission restart signal when the occupancy value of said output port buffer is less than a preset first threshold, said transmission control signal when the occupancy value of said output port buffer is between said first threshold and a preset second threshold, and said transmission stop signal when the occupancy value of said output port buffer is equal to or more than said second threshold.

16. The switch control method according to claim 13, wherein said second step includes the third step of comparing the present time with a scheduled transmission time computed in accordance with said second rate when transmitting said ATM cells at said second rate and the fourth step of performing control so as to transmit said ATM cells when said scheduled transmission time is earlier than said present time in said third step.

17. The switch control method according to claim 13, wherein said second step includes the fifth step of transmitting said ATM cells at the largest rate in order of scheduled transmission time computed in accordance with said second rate independently of the present time when transmitting said ATM cells at said first rate.

18. The switch control method according to claim 13, wherein said second step includes the sixth step of transmitting said ATM cells and thereafter computing the scheduled transmission time of an ATM cell to be transmitted next time.

19. The switch control method according to claim 13, wherein said second step includes the seventh step of generating a list by arranging said ATM cells to be transmitted in order of scheduled transmission time and the eighth step of controlling the transmission of an ATM cell located at the head of the list in accordance with a signal obtained from said first step.

20. The switch control method according to claim 13, wherein said first step first checks whether there is said output port buffer having an occupancy value less than said first threshold, then checks whether there is said output port buffer having an occupancy value between said first threshold and said second threshold, and finally checks whether there is said output port buffer having an occupancy value equal to or more than said second threshold.

21. The switch control method according to claim 20, wherein said first step outputs a transmission stop signal corresponding to said output port buffer when there is said output port buffer having an occupancy value equal to or more than said second threshold and thereafter, outputs any one of said transmission restart signal, said transmission stop signal, and said transmission control signal corresponding to each output port buffer again.

22. The switch control method according to claim 20, wherein said first step outputs again any one of said transmission restart signal, said transmission stop signal, and said transmission control signal corresponding to each output port buffer when there is not said output buffer having an occupancy value equal to or more than said second threshold.

23. The switch control method according to claim 19, wherein said second step stops the transmission of said ATM cells when said transmission stop signal is input and controls the transmission of an ATM cell next located in said list in accordance with a signal obtained from said first step.

24. The switch control method according to claim 19, wherein said second step decides a case in which said transmission restart signal, said transmission stop signal, or said transmission control signal is not input as an error and controls the transmission of an ATM cell next located in said list in accordance with a signal obtained from said first step.

* * * * *